(12) United States Patent
Honjo (10) Patent No.: US 11,343,461 B2
(45) Date of Patent: May 24, 2022

(54) DEVICE, CONTROL METHOD, AND COMPUTER-READABLE STORAGE MEDIUM

(71) Applicant: CANON KABUSHIKI KAISHA, Tokyo (JP)

(72) Inventor: Tomoya Honjo, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 54 days.

(21) Appl. No.: 17/019,603

(22) Filed: Sep. 14, 2020

(65) Prior Publication Data

US 2021/0092319 A1 Mar. 25, 2021

(30) Foreign Application Priority Data

Sep. 20, 2019 (JP) .............................. JP2019-171848

(51) Int. Cl.
| | |
|---|---|
| *H04N 5/76* | (2006.01) |
| *H04N 5/77* | (2006.01) |
| *H04N 5/907* | (2006.01) |
| *H04N 5/91* | (2006.01) |
| *H04N 5/93* | (2006.01) |

(52) U.S. Cl.
CPC .............. *H04N 5/77* (2013.01); *H04N 5/907* (2013.01); *H04N 5/91* (2013.01)

(58) Field of Classification Search
CPC H04N 5/77; H04N 5/91; H04N 5/907; H04N 5/225; H04N 1/2158; H04N 1/00928; H04N 2201/218; H04N 2201/001
USPC ......... 348/220.1, 222.1, 231.3, 231.7, 231.8, 348/231.9; 386/278, 289, 326
See application file for complete search history.

(56) References Cited

U.S. PATENT DOCUMENTS

| | | | |
|---|---|---|---|
| 4,887,234 | A | 12/1989 | Iijima |
| 7,912,991 | B1 | 3/2011 | Merry et al. |
| 9,946,645 | B2 | 4/2018 | Honjo et al. |
| 10,430,457 | B2 | 10/2019 | Honjo |
| 10,769,800 | B2 | 9/2020 | Honjo |
| 2012/0169897 | A1 | 7/2012 | Kam et al. |

(Continued)

FOREIGN PATENT DOCUMENTS

| | | |
|---|---|---|
| CN | 1331037 C | 8/2007 |
| CN | 102236611 B | 11/2013 |

(Continued)

OTHER PUBLICATIONS

Redmon, J. et al., "YOLO9000: Better Faster Stronger" Computer Vision and Pattern Recognition (CVPR) arXiv:1612.08242v1 (Dec. 2016) pp. 1-9.

(Continued)

*Primary Examiner* — Robert Chevalier
(74) *Attorney, Agent, or Firm* — Carter, DeLuca & Farrell LLP (57) ABSTRACT

A device that is attached/detached to/from an image capturing apparatus and that is configured to obtain image data related to an image captured by the image capturing apparatus, to execute analysis processing on the image data, and to store, in a storage of the device, at least a result of the analysis processing on the image data and information designating specific data is provided. The device deletes, based on the information, data stored in the storage when power supply to the device is started.

13 Claims, 5 Drawing Sheets

(56) References Cited

U.S. PATENT DOCUMENTS

2018/0220993 A1  8/2018  Poland
2019/0235880 A1  8/2019  Wu et al.

FOREIGN PATENT DOCUMENTS

| JP | 06014229 A | 1/1994 |
|---|---|---|
| JP | 3682512 B2 * | 8/2005 |
| JP | 2235567 C * | 10/2009 |
| JP | 2015231169 A | 12/2015 |
| JP | 2017005320 A | 1/2017 |

OTHER PUBLICATIONS

Aurthor Not Known: "SD Host Controller", Apr. 1, 2013 pp. 1-14, XP055764011, Retrieved from the Inernet: URL: https://www.latticesemi.com/-/media/LatticeSemi/Documents/ReferenceDesigns/SZ/SD HosController-Documentation.
Extended European Search Report dated Jan. 22, 2021, for Corresponding European Patent Application No. 20195660.4.

* cited by examiner

| PATCH NUMBER | PERSON COUNT OF nth FRAME |
|---|---|
| P1 | 0 |
| P2 | 2 |
| P3 | 1 |
| P4 | 1 |
| P5 | 2 |
| P6 | 2 |
| P7 | 0 |
| P8 | 0 |
| P9 | 0 |

FIG. 6

DEVICE, CONTROL METHOD, AND COMPUTER-READABLE STORAGE MEDIUM

BACKGROUND OF THE INVENTION

Field of the Invention

The present invention relates to a technique for data storage control in a device.

Description of the Related Art

In recent years, image processing such as image analysis of performing object detection and tracking or performing attribute estimation, and estimation of the number of objects based on the result of such image analysis is performed in various scenes using images captured by a monitoring camera. Conventionally, such image processing has been performed by transferring videos from the monitoring camera to a high performance arithmetic apparatus such as a PC or a server that executes actual image processing. However, the recent improvement of the processing capability of mobile arithmetic apparatuses allows the monitoring camera side to perform image processing. Processing on the camera side can be executed by, for example, an arithmetic apparatus arranged in a camera main body. When the arithmetic apparatus is arranged in a detachable device such as a USB, the detachable device can execute at least a part of processing.

Normally, a detachable device is used as external storage. Hence, by installing an arithmetic apparatus into the detachable device while keeping the function of the device as external storage, image analysis can be executed by this detachable device without degrading user convenience. On the other hand, in a case in which image analysis results have been stored by using the storage of this device, if the device is removed from the monitoring camera and connected as external storage to another device, this other device will be able to access not only the recorded videos, but also the image analysis results. Since the image analysis results become unnecessary when the processing ends, the image analysis results should be immediately deleted from the storage after they have been transferred to the monitoring camera side in cases other than a case in which the image analysis results are to be stored as metadata. However, depending on the removal timing of the detachable device, the detachable device may be removed without the deletion of the data of these results. In contrast, Japanese Patent Laid-Open No. H6-14229 discloses a technique in which a card is initialized when a camera has detected that the card has been inserted.

According to the technique disclosed in Japanese Patent Laid-Open No. H6-14229, even data that needs to be preserved is deleted by this initialization. Also, in the technique disclosed in Japanese Patent Laid-Open No. H6-14229, since the camera, which is on the side to which the device is attached, is to perform the initialization, the data will not be deleted in a case in which the card has been inserted into a device that does not have such an initialization function.

The present invention provides, in a device that has a storage function, a technique to prevent the deletion of data desired to be preserved and the preservation of unnecessary data.

SUMMARY OF THE INVENTION

According to one aspect of the present invention, there is provided a device that is attached/detached to/from an image capturing apparatus, comprising: an obtainment unit configured to obtain image data related to an image captured by the image capturing apparatus; a processing unit configured to execute analysis processing on the image data; a storage unit configured to store at least a result of the analysis processing on the image data and information designating specific data; and a deleting unit configured to delete, based on the information, data stored in the storage unit when power supply to the device is started.

Further features of the present invention will become apparent from the following description of exemplary embodiments (with reference to the attached drawings).

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made to an invention so that it requires all such features, and multiple such features may be combined as appropriate. Furthermore, in the attached drawings, the same reference numerals are given to the same or similar configurations, and redundant description thereof is omitted.

<System Arrangement>

Figure 1:
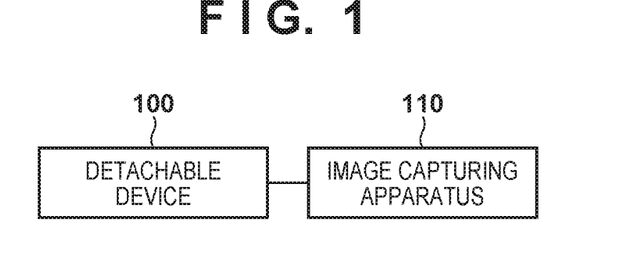
FIG. 1 is a block diagram showing an example of a system arrangement.

FIG. 1 shows an example of the arrangement of an image analysis system according to this embodiment. As an example, a case in which this system is a person count estimation system that estimates the number of persons in a captured image will be described below. However, the present invention is not limited to this, and the following argument can be applied to an arbitrary system for analyzing an image and performing predetermined information output. This system is configured to include an image capturing apparatus 110 and a detachable device 100. Note that the image capturing apparatus 110 includes a slot to/from which a device capable of recording, for example, a captured image can be attached/detached, and when the detachable device 100 is inserted into the slot, the image capturing apparatus 110 is connected to the detachable device 100.

The detachable device 100 is an arithmetic device attachable/detachable to/from the image capturing apparatus 110. As an example, the detachable device 100 is a device with a predetermined processing circuit mounted in an SD card. The detachable device 100 is configured to be inserted as a whole into the image capturing apparatus 110 in a form of, for example, an SD card, and can therefore be configured to be connectable to the image capturing apparatus 110 without making any portion project from the image capturing apparatus 110. Alternatively, the detachable device 100 may be configured such that, for example, a half or more of it can be inserted into the image capturing apparatus 110, and may therefore be configured to be connectable to the image capturing apparatus 110 while making a portion project a little from the image capturing apparatus 110. This can prevent the detachable device 100 from interfering with an obstacle such as a wiring and raise the convenience when using the device. In addition, since an SD card slot is prepared in a lot of existing image capturing apparatus 110 such as a network camera, the detachable device 100 can provide an extension function to the existing image capturing apparatus 110. Note that other than the form of an SD card, the detachable device 100 may be configured to be mounted in the image capturing apparatus 110 via an arbitrary interface used when mounting a storage device capable of storing an image captured by at least the image capturing apparatus 110. For example, the detachable device 100 may include a USB (Universal Serial Bus) interface, and may be configured to be mounted in a USB socket of the image capturing apparatus 110. The predetermined processing circuit is implemented by, for example, an FPGA (Field Programmable Gate Array) programmed to execute predetermined processing but may be implemented in another form. Note that in this embodiment, the detachable device 100 estimates the number of persons in an image input from the image capturing apparatus 110, and writes the estimation result in a storage area within the self-device. The details of the technique for estimating the number of persons will be described later.

The image capturing apparatus 110 is an image capturing apparatus such as a network camera that is connected to, for example, a network (not shown) and receives an instruction from another apparatus such as a personal computer (PC) or the like or provides information to the other device via the network. In this embodiment, the image capturing apparatus 110 incorporates an arithmetic apparatus capable of processing a video, but is not limited to this. For example, an external computer such as a PC (Personal Computer) connected to the image capturing apparatus 110 may exist, and the combination may be handled as the image capturing apparatus 110. Additionally, in this embodiment, the detachable device 100 is mounted in every image capturing apparatus 110. Note that although FIG. 1 shows one image capturing apparatus 110 and one detachable device mounted on this image capturing apparatus, the number of combinations of these apparatus and device may be two or more. When the detachable device 100 having an image analysis processing function is mounted in the image capturing apparatus 110, video processing can be executed on the side of the image capturing apparatus 110 even if the image capturing apparatus 110 does not have the image analysis processing function. Also, in a form in which an arithmetic apparatus for video processing is arranged in the image capturing apparatus 110, as in this embodiment, image processing executable on the side of the image capturing apparatus 110 can be diversified/sophisticated by mounting the detachable device 100 including an arithmetic apparatus in the image capturing apparatus 110.

<Apparatus Arrangement>

(Arrangement of Image Capturing Apparatus)

Figure 2:
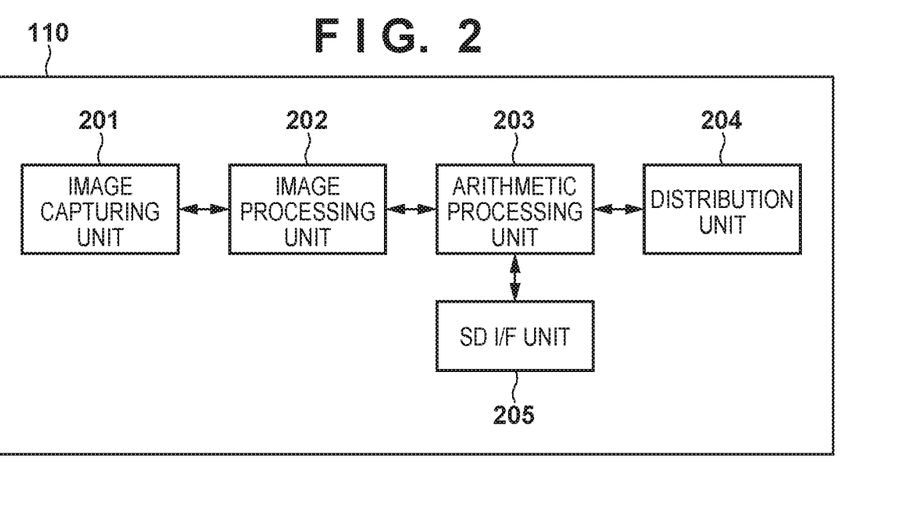
FIG. 2 is a block diagram showing an example of the hardware arrangement of an image capturing apparatus.

The arrangement of the image capturing apparatus 110 will be described next. FIG. 2 is a block diagram showing an example of the arrangement of the image capturing apparatus 110. As the hardware arrangement, the image capturing apparatus 110 includes, for example, an image capturing unit 201, an image processing unit 202, an arithmetic processing unit 203, a distribution unit 204, and an SD I/F unit 205. Note that I/F is an abbreviation of interface.

The image capturing unit 201 is configured to include a lens portion configured to form an image of light, and an image capturing element that performs analog signal conversion according to the formed image of light. The lens portion has a zoom function of adjusting an angle of view, a stop function of adjusting alight amount, and the like. The image capturing element has again function of adjusting sensitivity when converting light into an analog signal. These functions are adjusted based on setting values notified from the image processing unit 202. The analog signal obtained by the image capturing unit 201 is converted into a digital signal by an analog-to-digital conversion circuit and transferred to the image processing unit 202 as an image signal.

The image processing unit 202 is configured to include an image processing engine, and peripheral devices thereof. The peripheral devices include, for example, a RAM (Random Access Memory), the drivers of I/Fs, and the like. The image processing unit 202 performs, for example, image processing such as development processing, filter processing, sensor correction, and noise removal for the image signal obtained from the image capturing unit 201, thereby generating image data. The image processing unit 202 can also transmit setting values to the lens portion and the image capturing element and execute exposure adjustment to obtain an appropriately exposed image. The image data generated by the image processing unit 202 is transferred to the arithmetic processing unit 203.

The arithmetic processing unit 203 is formed by at least one processor such as a CPU or an MPU, memories such as a RAM and a ROM, the drivers of I/Fs, and the like. Note that CPU is the acronym of Central Processing Unit, MPU is the acronym of Micro Processing Unit, and ROM is the acronym of Read Only Memory. In an example, the arithmetic processing unit 203 will selectively execute at least one of analysis preprocessing, analysis processing, and analysis postprocessing on a captured image. In this embodiment, assume that the image capturing apparatus 110 will execute the analysis preprocessing and the detachable device 100 will execute the analysis processing and the analysis postprocessing. The analysis preprocessing is, for example, processing executed on a captured image before the analysis processing is executed. In the analysis preprocessing according to this embodiment, assume that, as an example, processing to create divided images by dividing a captured image will be executed. In this embodiment, arithmetic processing unit 203 will execute the preprocessing among these processing operations, and the analysis processing and the analysis postprocessing will be executed by the detachable device 100. An image received from the image processing unit 202 and has undergone processing by the arithmetic processing unit 203 as needed will be transferred to the distribution unit 204 or the SD I/F unit 205. In addition, data of the processing result will be transferred to, for example, the distribution unit 204.

The distribution unit 204 is configured to include a network distribution engine and, for example, peripheral devices such as a RAM and an ETH PHY module. The ETH PHY module is a module that executes processing of the physical (PHY) layer of Ethernet. The distribution unit 204 converts the image data or the data of the processing result obtained from the arithmetic processing unit 203 into a format distributable to a network (not shown), and outputs the converted data to the network. The SD I/F unit 205 is an interface portion used to connect the detachable device 100, and is configured to include, for example, a power supply, and a mounting part such as an attaching/detaching socket used to attach/detach the detachable device 100. Here, the SD I/F unit 205 is configured in accordance with the SD standard formulated by the SD Association. Communication between the detachable device 100 and the image capturing apparatus 110, such as transfer of an image obtained from the arithmetic processing unit 203 to the detachable device 100 or data obtaining from the detachable device 100, is performed via the SD I/F unit 205.

(Arrangement of Detachable Device)

Figure 3:
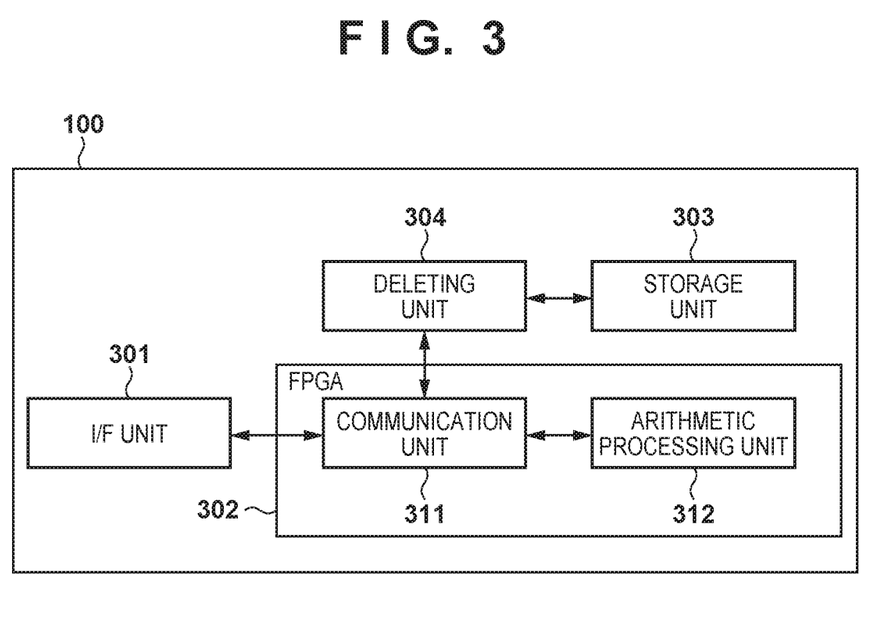
FIG. 3 is a block diagram showing an example of the arrangement of a detachable device.

FIG. 3 shows an example of the arrangement of the detachable device 100. The detachable device 100 includes, as an example, an I/F unit 301, an FPGA 302, a storage unit 303, and a deleting unit 304. The detachable device 100 is formed into a shape that can be inserted/removed into/from the attaching/detaching socket of the SD I/F unit 205 provided in the image capturing apparatus 110, that is, a shape complying with the SD standard.

The I/F unit 301 is an interface portion used to connect an apparatus such as the image capturing apparatus 110 and the detachable device 100. The I/F unit 301 is configured to include, for example, an electrical contact terminal that receives supply of power from the image capturing apparatus 110 and generates and distributes a power supply to be used in the detachable device 100, and the like. Concerning items defined in (complying with) the SD standard, the IF unit 301 complies with that, like the SD I/F unit 205 of the image capturing apparatus 110. Reception of images and setting data from the image capturing apparatus 110 and transmission of data from the FPGA 302 to the image capturing apparatus 110 are executed via the I/F unit 301.

The FPGA 302 is configured to include a communication unit 311 and an arithmetic processing unit 312. The FPGA 302 refers to a field-programmable gate array and is a kind of semiconductor device capable of repetitively reconstructing an internal logic circuit structure. By processing implemented by the FPGA 302, a processing function can be added (provided) to the apparatus in which the detachable device 100 is mounted. Additionally, since the logic circuit structure can be changed later by the reconstruction function of the FPGA 302, when the detachable device 100 is mounted in, for example, an apparatus in a field of a quickly advancing technology, appropriate processing can be executed in the apparatus at an appropriate timing. Note that in this embodiment, an example in which an FPGA is used will be described. However, for example, a general-purpose ASIC or a dedicated LSI may be used if processing to be described later can be executed. The FPGA 302 is activated by writing, from a dedicated I/F, setting data including the information of a logic circuit structure to be generated or reading out the setting data from the dedicated I/F. When powered on, the FPGA 302 reads out the setting data from, for example, the storage unit 303 and generates and activates a logic circuit. However, the present invention is not limited to this. For example, the image capturing apparatus 110 may write the setting data in the FPGA 302 via the I/F unit 301 by implementing a dedicated circuit in the detachable device.

The communication unit 311 is configured to include a circuit used to transmit/receive an image to/from the image capturing apparatus 110, a circuit that analyzes a command received from the image capturing apparatus 110, a circuit that controls based on a result of analysis, and the like. The communication unit 311 transfers an image to the storage unit 303 in the case of storage processing, and transfers an image to arithmetic processing unit 312 in the case of image analysis processing.

The arithmetic processing unit 312 is configured to include a CPU, a RAM, and the drivers of respective I/Fs, and executes analysis processing on each divided image transferred from the communication unit 311. Analysis processing is processing to analyze an input image and output the information obtained from the analysis. The analysis processing according to this embodiment is, as an example, person count estimation processing for estimating the number of persons in each divided image. However, this is merely an example, and another image analysis processing may be executed. The analysis processing can be processing configured to output the position of an object in a divided image using a machine learning model that has learned to detect an object included in an image using, for example, the technique in J. Redmon and A. Farhadi "YOLO9000: Better Faster Stronger" Computer Vision and Pattern Recognition (CVPR) 2016. As a result, the human bodies in the divided images are detected, and the number of persons in the divided images is estimated based on the total number of human bodies that have been detected. The arithmetic processing unit 312 can also execute, for example, at least some of the processes of the post-analysis processing. Post-analysis processing is processing to be executed after analysis processing is executed. In the post-analysis processing according to this embodiment, as an example, processing of outputting for every divided image, as a processing result, a value obtained by adding the numbers of objects detected in the divided images based on the analysis processing result for each divided image is executed. Note that in this embodiment, assume that the processing time required to estimate the number of persons does not depend on the number of persons, but depends only on the image size, and that the processing time for each image size to be accepted as an input has been stored in a ROM area (not shown). The processing time is a time from the start of the processing to select a processing-target image to a time until the writing of the result in the storage unit 303 is completed, but it may also be a time corresponding to this time.

The storage unit 303 is formed, for example, by a nonvolatile memory, and stores image data (for example, divided images) concerning an image captured by the image capturing apparatus 110 and processing results of image analysis processing by the arithmetic processing unit 312. Note that the arithmetic processing unit 312 manages frame numbers and stores the information of the output result in the storage unit 303 by adding a frame number to the information. Furthermore, the analysis result for each image will be written into a file with a file name which will constantly have the same prefix for each divided image. For example, in a case in which there are m divided images that had been added with numbers P1 to Pm, respectively, and each analysis result will be stored in a file named Pk_n.res ($1 \leq k \leq m$) in a case in which the frame number is n. For example, an analysis result of a divided image which has been added with a number P4 and whose frame number is 10 will be stored in a file named P4_10.res.

The deleting unit 304 can have an arrangement using, for example, a dedicated ASIC. However, this is merely an example, and it may have another arrangement as long as the processing operations to be described later can be executed. For example, the deleting unit may be partially embedded in the FPGA 302. The deleting unit 304 also includes a nonvolatile memory and a volatile memory (neither are shown). The nonvolatile memory holds a deletion list in which files which can be rewritten from an external apparatus and are to be deletion targets are registered and a protection list in which files to be protection targets are registered. The volatile memory stores a "deleted" flag which indicates that the deleting unit 304 has operated once. For example, each deleted flag is held while power is supplied to the detachable device 100, and the deleted flag is eliminated in a case in which the supplying of power stops due to the removal of the detachable device from the image capturing apparatus 110. The deleting unit 304 deletes each file stored in the storage unit 303 in accordance with the deletion list or the protection list.

(Procedure of Processing)

An example of the procedure of processing executed by the image capturing apparatus 110 and the detachable device 100 will be described next.

First Processing Example

The first processing example will be described with reference to FIG. 4 and FIGS. 5A to 5D. In this processing, the deleting unit 304 holds the deletion list and executes deletion processing based on the deletion list.

Figure 4:
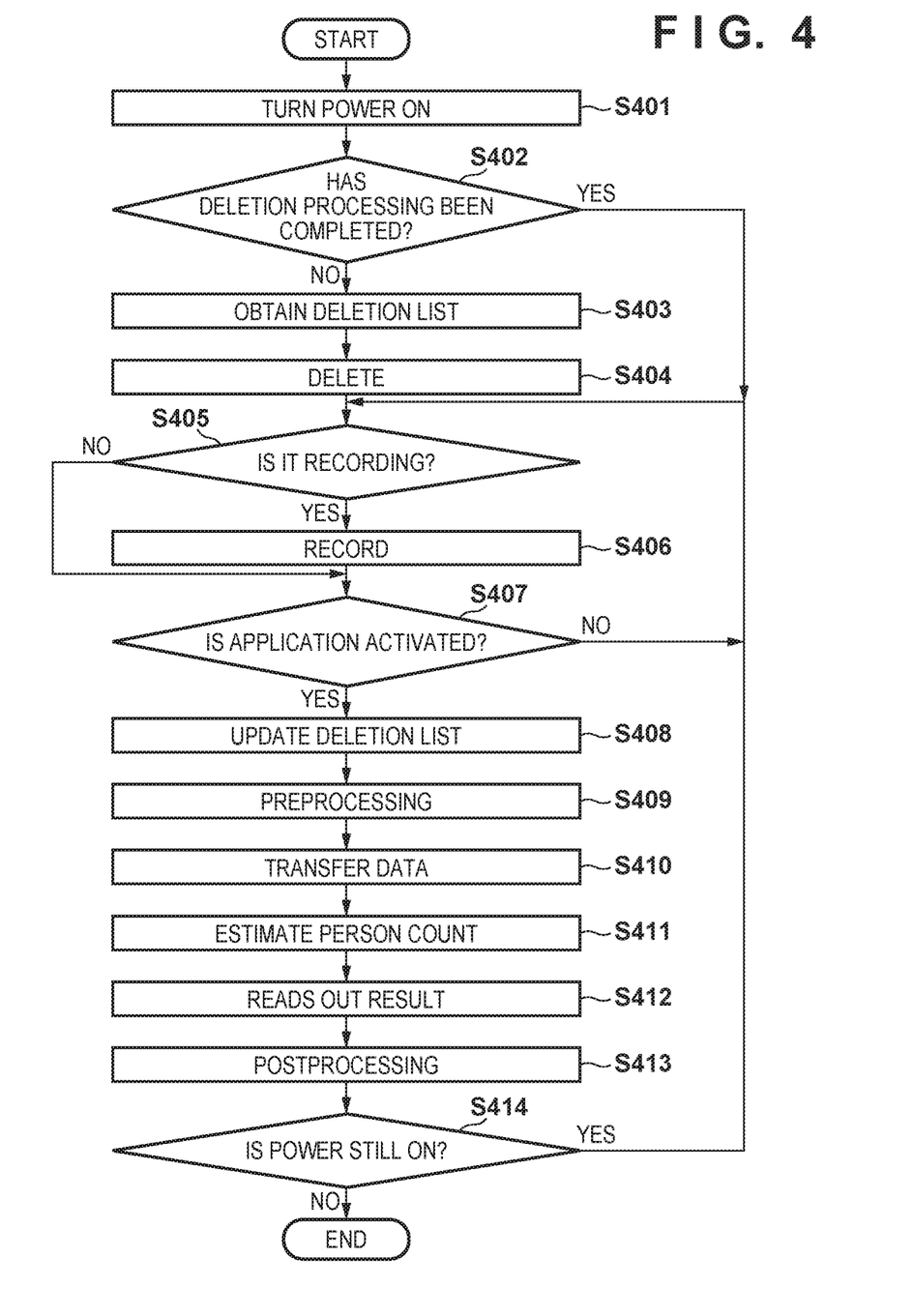
FIG. 4 is a flowchart showing a first example of processing to be executed in the system.

In this processing, first, the detachable device 100 is powered on when the detachable device 100 is mounted (step S401) on the image capturing apparatus 110. That is, the mounting of the detachable device 100 on the image capturing apparatus 110 starts the power supply from the image capturing apparatus 110, and power is supplied to the IF unit 301, the FPGA 302, the storage unit 303, and the deleting unit 304 of the detachable device 100. Upon receiving power, the deleting unit 304 checks whether a deleted flag is present in the volatile memory (step S402). Note that since each deleted flag will be eliminated when the detachable device 100 is removed, it will be determined that the deleted flag is not present immediately after the detachable device 100 has been mounted on the image capturing apparatus 110 (NO in step S402). On the other hand, after the detachable device 100 has been mounted on the image capturing apparatus 110 and a deleted flag has been created by the execution of the process of step S404 (to be described later), it will be determined that the deleted flag is present (YES in step S402). If the deleted flag is not present, the deleting unit 304 will execute the processes of steps S403 and S404. If the deleted flag is present, the processes of steps S403 and S404 will not be executed.

In step S403, the deleting unit 304 refers to a deletion list written in the nonvolatile memory, and determines, based on the deletion list, each file to be deleted from a file present in the storage unit 303. In this case, assume that the FPGA has been configured to detect a specific object in another image capturing device before the detachable device 100 was mounted on the image capturing apparatus 110 in step S401, and that the corresponding processing has been performed. Assume that, at this time, a recorded file record.mp4 and detect_n.res, detect_n+1.res, and detect_n+2.res as analysis results have been stored in the storage unit 303. Assume also that detect_*.res (* is an arbitrary character string) has been registered in the deletion list. In this case, the deleting unit 304, based on the deletion list, will determine detect_n.res, detect_n+1.res, and detect_n+2.res to be the three files which are the files to be deleted.

In step S404, the deleting unit 304 deletes the files determined to be the deletion targets in step S403. That is, the deleting unit 304 deletes detect_n.res, detect_n+1.res, and detect_n+2.res from the storage unit 303. As a result, only the recorded file record.mp4 will be preserved undeleted in the storage unit 303. After the deletion processing of step S404, the deleting unit 304 creates deleted flags in the volatile memory.

On the other hand, the image capturing apparatus 110 determines whether a recording instruction has been issued (step S405). If a recording instruction has been issued (YES in step S405), the image capturing apparatus 110 causes the arithmetic processing unit 203 to store an image processed by the image processing unit 202 as a video in the storage unit 303 of the detachable device 100. Assume that this video is stored under a file name called record_2.mp4. Subsequently, the image capturing apparatus 110 determines whether an instruction to execute the person count estimation processing for estimating the number of persons in the image has been issued (step S407). Note that although this embodiment describes a case in which the person count estimation processing is used as an example of an application to be executed, another application (analysis processing) may be set as the execution target. If the arithmetic processing unit 203 of the image capturing apparatus 110 determines that the instruction to execute the person count estimation processing has not been issued (NO in step S407), the process returns to step S405. On the other hand, if the arithmetic processing unit 203 determines that the instruction to execute the person count estimation processing has been issued (YES in step S407), the deletion list stored in the deleting unit 304 of the detachable device 100 is updated (step S408). In this case, the arithmetic processing unit 203 updates the deletion list so that the deletion list will include the analysis results to be output to the storage unit 303 by the arithmetic processing unit 312 which is to execute the person count estimation processing. For example, detect_*.res which was registered in the deletion list up to this point is deleted. Subsequently, nine files, that is. P1_*.res, P2_*.res, P3_*.res. P4_*.res, P5_*.res, P6_*.res. P7_*.res, P8_*.res, and P9_*.res (* is an arbitrary character string) are registered in the deletion list. Note that data to be registered in the deletion list can be designated via the arithmetic processing unit 203 of the image capturing apparatus 110. For example, the arithmetic processing unit 203 notifies the deleting unit 304 of the names of data to be registered in the deletion list and the information to designate the processing for generating deletion target data. The arithmetic processing unit 203 may also notify the deleting unit 304 of information which indicates that all of the same type of data will be set as deletion targets when the result from the analysis processing of step S412 (to be described later) is to be read out. For example, the arithmetic processing unit 203 may recognize each file name of the analysis processing by reading out the data of each analysis result from the storage unit 303, and notify the deleting unit 304 that each file with the same extension as that of this filename is a deletion target. Upon receiving such a notification, the deleting unit 304 may sequentially update the deletion list in accordance with the notification.

Figure 5A:
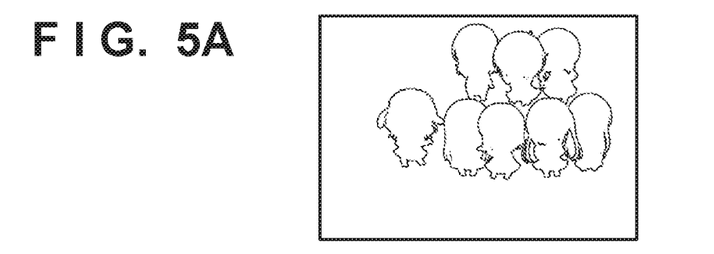
FIGS. 5A to 5D are views for describing the outline of image analysis processing.
Figure 5B:
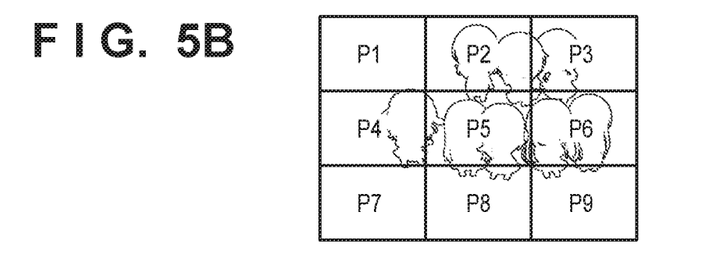

Subsequently, the arithmetic processing unit 203 of the image capturing apparatus 110 creates, as preprocessing, divided images by dividing an nth frame image (FIG. 5A) captured by the image capturing unit 201 and corrected by the image processing unit 202 (step S409). In this embodiment, nine divided images are generated by uniformly dividing the image into thirds in the vertical direction and dividing the image into thirds in the horizontal direction. FIG. 5B shows an example of divided images obtained in this case. Note that although the image is uniformly divided into nine regions by vertically and horizontally dividing the image into thirds in this case, an arbitrary division method may be employed in accordance with the person count estimation processing or the performance of the FPGA 302. For example, the divided images need not be always generated so no overlapping regions will be present as shown in FIG. 5B, and the divided images may be generated so as to include regions that overlap each other. Note that in FIG. 5B, although numbers P1 to P9 have been added to the respective divided images, these numbers have been added for the sake of convenience in designating each divided image. Note that in this embodiment, the size of each image to be input is the same for each frame, and the size of each divided image is also immutable. After the division of the image, the arithmetic processing unit 312 transfers the divided images via the SD I/F unit 205, the I/F unit 301, and the communication unit 311 (step S410).

Note that, for example, at the point of step S409, the arithmetic processing unit 203 specifies, based on the divided image size, the processing time of the person count estimation processing to be performed on all of the divided images by the arithmetic processing unit 312 of the detachable device 100 by executing a calculation or the like. For example, based on the information of the relationship between the processing time and the divided image size stored in the ROM (not shown) of the detachable device 100, the arithmetic processing unit 203 specifies a processing time T corresponding to the divided image size obtained in the above-described manner. This specified processing time is the processing time for one divided image. The arithmetic processing unit 203 calculates a processing time 9T of the person count estimation processing by multiplying the specified processing time T by 9 as the number of divided images.

Figure 5C:
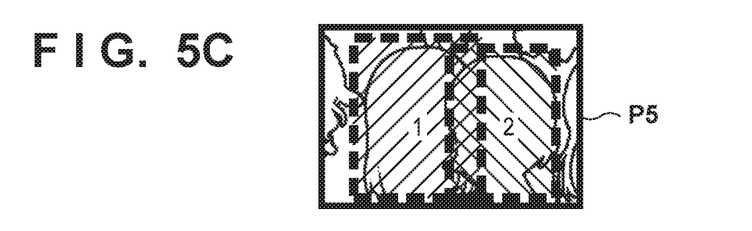
Figure 5D:
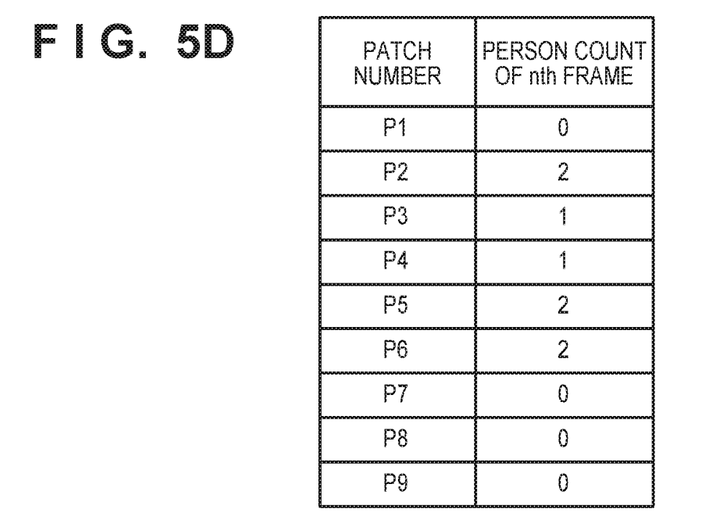

The arithmetic processing unit 312 of the detachable device 100 executes the person count estimation processing on each divided image transferred in step S410 (step S411). For example, an example of human body detection executed in P5 is shown in FIG. 5C. As shown in FIG. 5C, since two human bodies are detected, "2" is obtained as the estimation value of the number of persons in P5 of the nth frame. The number of persons estimated for P5 in this manner is stored as an analysis result by the arithmetic processing unit 312 under P5_n.res as a file name in the storage unit 303. Similar processing operations are executed on other divided images, and each file Pi_n.res (1≤i≤9) is stored as an analysis result in the storage unit 303.

Subsequently, after the estimated processing time 9T has elapsed upon completion of the process of step S410, the arithmetic processing unit 203 of the image capturing apparatus 110 obtains the analysis results of all of the divided images stored in the storage unit 303 as the processing result of the nth frame (step S412). This obtainment of the processing result is performed via the SD I/F unit 205, the I/F unit 301, and the communication unit 311. Subsequently, the arithmetic processing unit 203 transmits an instruction to the deleting unit 304 of the detachable device 100 to delete the analysis result files of all of the divided images stored in the storage unit 303. However, this deletion instruction may be implicit, and it may be arranged so that the results will be automatically deleted upon completion of the readout of the analysis processing results. In this case, the deleting unit 304 can be configured to delete, of the data that was read out, data that matches the condition registered in the deletion list in accordance with the deletion list. Subsequently, the arithmetic processing unit 203 integrates, as postprocessing, the person count estimation results of all of the divided images and outputs the integrated result as the person count estimation result of the nth frame (step S413). In this embodiment, the estimated person count is estimated to be 0+2+1+1+2+2+0+0+0=8 based on FIG. 5D. Subsequently, if power continues to be supplied to the detachable device 100 (YES in step S414), the process returns to step S405. If power supply has stopped (NO in step S414), the processing ends.

A case in which the detachable device 100 is removed from the image capturing apparatus 110 in the middle of the process of step S412 at frame number n will be considered as an example. In this case, the analysis results P1_n.res, P2_n.res, P3_n.res, P4_n.res, P5_n.res, P6_n.res, P7_n.res, P8_n.res, and P9_n.res will be preserved in the storage unit 303. However, if the detachable device 100 is mounted onto another apparatus and is powered on in this state, all of these analysis results will be deleted in accordance with the deletion list written in the nonvolatile memory of the deleting unit 304. In this manner, by forming a deletion list for designating files, such as analysis results and the like, to be deleted in accordance with the execution-target processing, the detachable device 100 can reliably delete each deletion-target file, which was preserved at the point when power supply was stopped, after power supply is started again. On the other hand, the files record.mp4 and record_2.mp4 which are indicated on the deletion list but are not deletion targets will be preserved in the storage unit 303 without being deleted. As a result, the convenience of the detachable device 100 can be improved by reliably preserving each file that needs to be preserved. Note that while the detachable device 100 is operated in a state in which it is mounted on the image capturing apparatus 110, the data to be deleted is sequentially deleted from the storage unit 303 in accordance with an instruction from the arithmetic processing unit 203. Thus, the deletion processing need not be executed if the detachable device 100 is removed after the analysis processing has ended. Hence, if the analysis result has ended while the detachable device 100 remains mounted, the detachable device 100 may clear the deletion list after the analysis processing has ended. As a result, the detachable device 100 need not search for data that is written in the deletion list when it is mounted onto another apparatus.

Note that although the arithmetic processing unit 203 deleted the analysis results of all of the divided images stored in the storage unit 303 in step S412 in the above-described processing example, the deleting unit 304 may execute this deletion. For example, it may be arranged so that a reset part configured to delete each deleted flag will be added and the deletion processing of steps S403 and S404 will be executed again by deleting the deleted flag when a reset instruction is issued from the image capturing apparatus 110 to the deleting unit 304. Also, in step S410, a command to load the analysis results from the image capturing apparatus 110 can be received other than a reset instruction, and the deleted flag can be deleted after the data transfer has been completed so that it will be possible to execute the deletion processing again immediately after the deletion. This arrangement will allow the deleting unit 304 to be used effectively.

Also, although each deleted flag is managed in the volatile memory of the deleting unit 304 in the above-described processing example, another arrangement such as a physical circuit or the like may be used as long as it is possible to determine whether the deletion processing has been performed in the deleting unit 304. Also, although a case in which the analysis result files of the person count estimation processing are registered in the deletion list is described in the above-described processing example, files and the like to be temporarily stored in the detachable device 100 from the image capturing apparatus 110 may be registered in the deletion list. For example, in a case in which a plurality of processed images are required for image analysis processing and these images cannot be stored in the memory of the image capturing apparatus 110, these images may be temporarily saved in the detachable device 100. Registration of information in the deletion list may be performed so that these temporarily saved files will be set as deletion targets in such a use method of the detachable device 100.

In addition, although the person count estimation processing is performed in the above-described processing example, another image analysis processing such as facial authentication or the like may be performed. For example, in a case in which facial authentication is to be executed, extraction of characteristic amounts of the facial region, among the processing operation required for facial authentication, may be performed by the detachable device 100, and the other processing operations may be performed by the image capturing apparatus 110. At this time, the facial regions of a person who is to be facially authenticated can be set as the divided images, and the arithmetic processing unit 312 can extract the characteristic amounts of the facial regions from the respective divided images and store the result in the storage unit 303. At this time, a deletion list is generated so that the pieces of information of the analysis result to be stored in the storage unit 303 will be set as deletion targets. Also, not only images, but data (for example, data obtained from extracting HOG characteristics and the like) obtained by performing processing on the images by the arithmetic processing unit 203 may be input to the detachable device 100. Also, the processing to be executed may be processing to overlay a predetermined masking image or performing mosaic processing on a person detected from an input image for, for example, privacy protection. In addition, the processing to be executed may also be processing that uses a learned model which has learned a specific action of a person by machine learning to detect whether a person in an image is performing the specific action. Furthermore, the processing to be executed may be processing to determine what type of a region has been captured in the image. For example, it may be a processing that determines the type of the region captured in the image by using a learned model which has learned to identify a building, a road, a person, the sky, and the like by machine learning. As described above, the analysis processing that can be executed is applicable to image analysis processing which uses machine learning and to image analysis processing which does not use machine learning.

Second Processing Example

Figure 6:
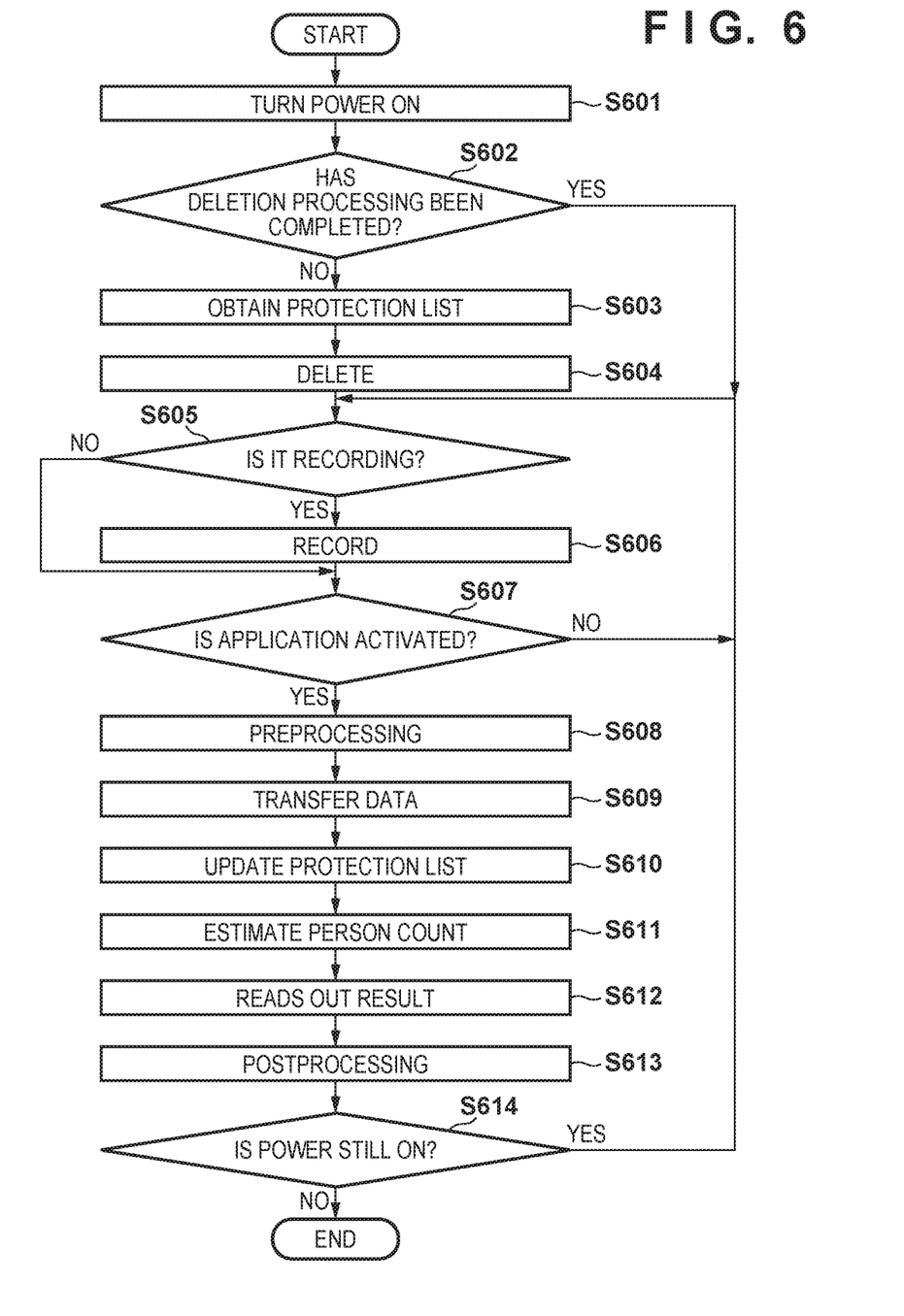
FIG. 6 is a flowchart showing a second example of the processing to be executed in the system.

The second processing example will be described with reference to FIG. 6. In this processing, the deleting unit 304 holds a protection list and executes deletion processing based on the protection list.

In this processing, the arithmetic processing unit 312 of the detachable device 100 also obtains and outputs, as an analysis result, the position of each human body detected in the human body detection processing. A human body position can be obtained by detecting a human body by using the method of J. Redmon and A. Farhadi "YOLO9000: Better Faster Stronger" Computer Vision and Pattern Recognition (CVPR) 2016. In this case, the center coordinate position of a face will be used as a human body position. Also, the analysis result of the arithmetic processing unit 312 is written in a specific folder (to be referred to as a result folder in this case) in the storage unit 303. In a similar manner to the first processing example, the analysis result for each divided image will be written into a file with a file name which will constantly have the same prefix for each divided image. For example, if there are 9 divided images, each image is added with a number Pi ($1 \leq i \leq 9$), and each person count estimation result is stored in a file with a name called Pi_num_n.res in a case in which the frame number is n. Also, assume that each human body position estimation result is stored in a file with a name called Pi_pos_n.res. Furthermore, assume that the analysis result for each predetermined frame (for example, when the frame number is multiple of 300) is preserved as metadata in the storage unit 303.

The deleting unit 304 holds, in the nonvolatile memory (not shown), a protection list in which data to be the protection target is registered. The protection list is configured to be rewritable from, for example, an external apparatus such as the image capturing apparatus 110 or the like. The deleting unit 304 will selectively protect, among the analysis results of the arithmetic processing unit 312 (files in the result folder) which have been stored in the storage unit 303, files registered in the protection list and delete the other files. As a result, settings can be made flexibly so necessary files will not be deleted.

The processing of FIG. 6 will be described. The processes of steps S601 and S602 are similar to the processes of steps S401 and S402 in FIG. 4. In step S603, the deleting unit 304 refers to a protection list written in the nonvolatile memory, and determines each file to be the deletion target among the files stored in the storage unit 303 (step S603). In this case, assume that the FPGA has been configured to detect a specific object in another image capturing device before the detachable device 100 was mounted on the image capturing apparatus 110 in step S601, and that the corresponding processing has been performed. Assume that, at this time, the recorded file record.mp4 and detect_n.res, detect_n+1.res, and detect_n+2.res as analysis results have been stored in the result folder of the storage unit 303. Assume also that result/detect_n.res has been registered in the protection list. In this case, the file detect_n.res is excluded from the deletion targets and the two files detect_n+1.res and detect_n+2.res are set as deletion targets among the files present in the result folder. Note that record.mp4 may also be included in the protection list. In addition, record.mp4 may not be deleted by using the deletion list of the first processing example and excluding record.mp4 from the deletion list. That is, the protection list may be used as a list for defining files which are to be preserved exceptionally among the files written on the deletion list. For example, by including result/detect_*.res in the deletion list and including result/detect_n.res in the protection list, detect_n+1.res and detect_n+2.res can be set as the deletion targets. In step S604, the deleting unit 304 deletes each file set as a deletion target in step S603. Subsequently, a corresponding deleted flag is created in the volatile memory.

The processes of steps S605 to S607 are similar to those of steps S405 to S407 of FIG. 4. In addition, the process of step S608 is similar to that of step S409 of FIG. 4.

In step S609, the arithmetic processing unit 203 of the image capturing apparatus 110 transfers each of the divided images obtained by dividing the captured image to the arithmetic processing unit 312 of the detachable device 100. At this time, the arithmetic processing unit 203 adds, for example, to the start of each divided image, a 1-bit flag indicating whether the analysis result obtained by inputting the divided image in the person estimation processing is to be protected. For example, the flag is set to 1 if the analysis result is to be protected, and the flag is set to 0 if the analysis result is not to be protected. In this case, the flag to be added to the start of each divided image is set to 1 in a case in which the frame number is a multiple of 300, and the flag to be added to the start of each divided image is set to 0 in other cases. Assume that the frame number n set as a target in this description is a multiple of 300, and that 1 has been added as a flag to the start of each divided image to be transferred to the detachable device 100.

The arithmetic processing unit 312 analyzes the 1 bit at the start of each divided image obtained in step S609, and detects the frame number of each divided image whose value is 1. Then, the arithmetic processing unit 312 adds the file name of the analysis result (the person count and the human body position estimation result) output for this divided image to the protection list of the deleting unit 304 (step S610). For example, if 1 is indicated in the flags of all of the divided images of the nth frame, each person count estimation result Pi_num_n.res ($1 \le i \le 9$) and each human body position estimation result Pi_pos_n.res ($1 \le i \le 9$) are registered in the protection list.

The process of step S611 is similar to the process of step S411 of FIG. 4. In step S612, after 9T has elapsed from the completion of the process of step S609, the arithmetic processing unit 203 obtains the analysis results of all of the divided images stored in the storage unit 303 as the processing result of the nth frame. Subsequently, the arithmetic processing unit 203 transmits an instruction to the detachable device 100 so that the analysis results (the person count and human body position estimation results) of all of the divided images stored in the storage unit 303 will be deleted in cases other than a case in which the frame number of the obtained result is a multiple of 300. That is, while the detachable device 100 is operating in a state in which it is mounted on the image capturing apparatus 110, the deleting unit 304 will sequentially delete the data to be deleted from the storage unit 303 based on the instruction from the arithmetic processing unit 203. However, this deletion instruction may be implicit, and it may be arranged so that the results will be automatically deleted upon completion of the readout of the analysis processing results. In such a case, it can also be arranged so that the deleting unit 304 will refer to the protection list or the above-described flags and not delete data which is to be preserved. The processes of steps S613 and S614 are similar to those of steps S413 and S414 of FIG. 4.

A case in which the detachable device 100 is removed from the image capturing apparatus 110 in the middle of the process of step S612 when, for example, the frame number n is set will be considered. In this case, each person count estimation result Pi_num_n.res ($1 \le i \le 9$) and each human body position estimation result Pi_pos_n.res ($1 \le i \le 9$) will be preserved in the result folder of the storage unit 303. If the detachable device is mounted to another image capturing apparatus in this state, the deleting unit 304 can preserve these person count and human body position estimation results and record.mp4 and record_2.mp4, in accordance with the protection list written in the nonvolatile memory, instead of deleting them.

As described above, according to the second processing example, by using the protection list, each file to be preserved can be excluded from the deletion targets which are deleted when the detachable device 100 is mounted to an external apparatus such as the image capturing apparatus 110 or the like. As a result, it will be possible to prevent a state in which files to be preserved are deleted at once and improve the convenience of the detachable device 100. In addition, by updating the protection list as needed at the time of data transfer to the storage unit 303, it will be possible to appropriately exclude each necessary file from the deletion targets in accordance with the situation.

In the above-described second processing example, a 1-bit flag representing whether an analysis result of a corresponding divided image is to be protected is added to the start of each divided image. However, the present invention is not limited to this. For example, whether the analysis result of a divided image is to be a protection target can be designated by a command which is used when each divided image is transferred. For example, two types of write addresses that can be recognized between the image capturing apparatus 110 and the detachable device 100 and can be designated in the argument portion of a write command at the time of data transfer to the FPGA may be defined. Note that the divided images are transferred to be FPGA regardless of the write addresses that have been defined. If a first address among the two types of addresses is designated, the FPGA may determine that the corresponding analysis result is to be protected and update the protection list. If a second address is designated, the FPGA may determine that the corresponding analysis result need not be protected. In addition, the types of write addresses may be further increased so that the protection target analysis result can be selected each time. For example, it may be set so that the person count and the human body position estimation results will be protected if a first write address is designated, and only the person count estimation result will be protected if a second write address is designated. It may also be set so that only the human body position estimation result will be protected if a third write address is designated, and neither of the results will be protected if a fourth write address is designated. Furthermore, instead of a write address, a bit portion of a part of a write command may be used for the transmission of the flags as described above.

In addition, whether the analysis result of a divided image is to be set as a protection target can be determined based on the difference in the data transfer protocol to be used in compliance with the SD standard. For example, in a case in which a first protocol, in which a block count command that designates the number of blocks to be written will be transmitted in advance, is to be used when a multi-write command is to be transmitted, the analysis result of the image data to be written by this protocol can be set as a protection target. On the other hand, in a case in which a second protocol in which the block count designation command will not be transmitted in advance is to be used, the analysis result of the image data written by this protocol is not set as a protection target. Furthermore, this arrangement may be reversed, and the analysis result of the image data written by using the second protocol may be set as a protection target. In this manner, the image capturing apparatus 110 may issue, to the detachable device 100, instructions about the data to be protected and the data not to be protected based on the differences in the protocols to be used when the same processing is to be executed. Note that although processing based on the SD standard has been described here, a similar method can also be used in a method that complies with a different standard. That is, whether information that is to be stored in association with data to be written is to be set as a protection target can be determined based on differences in write addresses or differences in protocols to be used when the same processing is to be executed.

Furthermore, although each analysis result of the arithmetic processing unit 312 is written in a specific (result) folder in the second processing example, the present invention is not limited to this. For example, it may be arranged so that the analysis result will be written in the range of a specific address, and the deleting unit 304 may delete each file other than a file registered in the protection list in the range of the specific address.

As described above, the detachable device 100 according to the above-described embodiment is configured to delete, upon detecting the start of power supply, specific data from a storage device based on a designated list and preserve data other the specific data. As a result, it will be possible to preserve necessary data and prevent data that should not be preserved, such as an analysis result and the like, from being preserved.

In the above-described embodiment, image analysis processing has been described as an example of analysis processing. However, the present invention is also applicable to sound analysis processing. For example, the present invention can be applied to processing of detecting a sound pattern such as a scream, a gunshot, or glass breaking sound. For example, a characteristic amount of a sound is extracted by various sound data analysis methods such as spectrum analysis and compared with the detected sound pattern. By calculating the degree of matching, a specific sound pattern can be detected.

When performing sound analysis processing, sound data is divided into sound data of a predetermined time, sound analysis processing is performed using the sound data of the predetermined time as a unit. In addition, the predetermined time appropriately changes depending on the sound pattern of the detection target. For this reason, sound data of a time corresponding to a sound pattern to be detected is input to the detachable device 100. The detachable device 100 has a function of analyzing the input sound data or a function of holding the input sound data.

In the above-described embodiment, the detachable device 100 capable of non-temporarily storing data input from the image capturing apparatus 110 has been described as an example. However, in some embodiments, the detachable device 100 that cannot non-temporarily store data input from the image capturing apparatus 110 may be used. That is, the detachable device 100 may only perform analysis processing for data input from the image capturing apparatus 110, and may not non-temporarily store the data. In other words, the detachable device 100 can be arranged to be a device only for analysis processing instead of a device for storing data like a normal SD card.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-171848, filed Sep. 20, 2019 which is hereby incorporated by reference herein in its entirety.

What is claimed is:

1. A device that is attached/detached to/from an image capturing apparatus, comprising:
   at least one processing circuit; and
   at least one memory that stores a computer-readable instruction for causing, when executed by the at least one processing circuit, the device to:
   obtain image data related to an image captured by the image capturing apparatus;
   execute analysis processing on the image data;
   store at least a result of the analysis processing on the image data and information designating specific data in the at least one memory; and
   delete, based on the information, data stored in the at least one memory when power supply to the device is started.

2. The device according to claim 1, wherein the information includes first information that designates data to be deleted when the power supply is started.

3. The device according to claim 2, wherein the first information designates the result of the analysis processing as the data to be deleted.

4. The device according to claim 1, wherein the information includes second information that designates data not to be deleted.

5. The device according to claim 4, wherein the second information designates a part of the result of the analysis processing as the data not to be deleted.

6. The device according to claim 4, wherein the computer-readable instruction further causes, when executed by the at least one processing circuit, the device to accept, from the image capturing apparatus, designation of data to be designated by the second information.

7. The device according to claim 4, wherein the second information is generated based on the image data obtained.

8. The device according to claim 4, wherein the second information is generated based on a protocol to be used when the image data is written into the at least one memory from the image capturing apparatus.

9. The device according to claim 4, wherein the second information is generated based on an address of the at least one memory designated when the image data is written into the device from the image capturing apparatus.

10. The device according to claim 1, wherein the data to be deleted is deleted from the at least one memory based further on an instruction from the image capturing apparatus.

11. The device according to claim 1, wherein the device is in the form of an SD card.

12. A control method that is executed by a device that is attached/detached to/from an image capturing apparatus, the method comprising
- obtaining image data related to an image captured by the image capturing apparatus;
- executing analysis processing on the image data;
- storing at least a result of the analysis processing on the image data and information designating specific data in at least one memory; and
- deleting, based on the information, data stored in the at least one memory when power supply to the device is started.

13. A non-transitory computer-readable storage medium that stores a program configured to cause a computer provided in a device that is attached/detached to/from an image capturing apparatus to:
- obtain image data related to an image captured by the image capturing apparatus;
- execute analysis processing on the image data;
- store at least a result of the analysis processing on the image data and information designating specific data in at least one memory; and
- delete, based on the information, data stored in a storage unit when power supply to the device is started.

* * * * *